United States Patent [19]

Kaplan

[11] Patent Number: 5,565,958
[45] Date of Patent: Oct. 15, 1996

[54] LINEAR LIGHT SOURCE FOR A FILM SCANNER

[75] Inventor: Martin C. Kaplan, Rochester, N.Y.

[73] Assignee: Eastman Kodak Company, Rochester, N.Y.

[21] Appl. No.: 421,164

[22] Filed: Apr. 13, 1995

[51] Int. Cl.$^6$ .......................... G03B 27/72; G03B 15/04
[52] U.S. Cl. .................... 355/67; 355/71; 355/35
[58] Field of Search ...................... 355/163, 45, 52, 355/67, 71, 35; 250/228; 356/236

[56] References Cited

U.S. PATENT DOCUMENTS 4,868,383  9/1989  Kurtz et al. .................. 250/228

FOREIGN PATENT DOCUMENTS 3405593A  8/1984  Germany .................. 355/71

OTHER PUBLICATIONS

W. T. Welford and R. Winston, "High Collection Nonimaging Optics", 1989, Academic Press, pp. 53–73.

Primary Examiner—Arthur T. Grimley
Assistant Examiner—Herbert V. Kerner
Attorney, Agent, or Firm—Thomas H. Close

[57] ABSTRACT

A linear light source includes: a lamp for producing a beam of light; a cylindrical integrating cavity having an entry port for introducing the beam of light into the cylindrical integrating cavity and a linear slot parallel to the cylindrical axis of the integrating cavity for emitting a line of diffuse light that is uniform over an angular range; and an optical element aligned with the slot for reducing the angular divergence of the light exiting from the slot.

5 Claims, 1 Drawing Sheet

LINEAR LIGHT SOURCE FOR A FILM SCANNER

FIELD OF THE INVENTION

The present invention relates to a linear light source, and more particularly, to such a light source for use in a film scanner.

BACKGROUND OF THE INVENTION

Linear light sources are used in a variety of applications. In particular, they are used in film scanners, to illuminate a line on the film. One type of linear light source being used in film scanners consists of a lamp and an integrating cavity of cylindrical shape and having a linear slot parallel to the cylindrical axis for emitting a line of diffuse light. Optical elements convey light from the lamp into the cavity through a port in the cavity. Inside the cavity, the light reflects off the interior surfaces, and exits through the linear slot in the cavity, providing a linear, uniform, diffuse source of light at the slot. Such a system is described in U.S. Pat. No. 4,868,383, issued Sep. 19, 1989 to Kurtz et al. The width of the exit slot in a film scanner for 35 mm film is generally on the order of 2–5 mm. In film scanner applications, the diffuseness of the light suppresses the undesirable optical effects of scratches in the film. However, while the cylindrical integrating cavity produces completely diffuse light, meaning the luminance is uniform at all angles up to 90°, only the light up to a certain angle (typically about 45°) is useful in suppressing the scratch effects. The light beyond this angle is wasted, causing a loss of efficiency, and also possibly causing undesirable effects such as optical flare and heating of the film. There is a need therefore for a linear light source having means to limit the angular range of emitted light.

SUMMARY OF THE INVENTION

Briefly summarized, according to one aspect of the present invention, a partially diffuse, spatially uniform linear light source is described. Light from a lamp is introduced into a cylindrical integrating cavity. The light diffuses within the cavity, and then escapes through a long rectangular exit slot in the wall of the cavity. Means are provided for reducing the angular divergence of the light exiting from the slot. In one embodiment, a non-imaging optical element, consisting of a long wedge (which may be solid glass, or a pair of mirrors arranged parallel to the slot), reduces the angular divergence of the light from the slot. In an alternative embodiment, a cylindrical lens is provided for reducing the angular divergence of the light from the slot.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
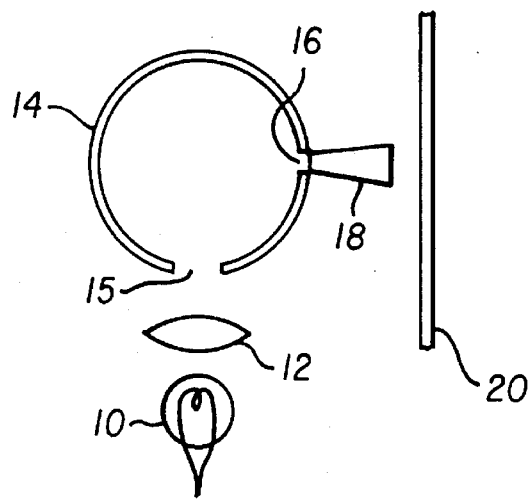
FIG. 1 is a linear light source, using non-imaging wedge optic to limit angular range of light output according to the present invention.

Referring to FIG. 1, a linear light according the present invention is shown. Light from a lamp 10 passes through a lens 12 into the interior of a cylindrical integrating cavity 14 through an entry port 15. Inside the cavity 14, the light reflects multiple times from the interior surface before leaving through an exit slot 16. The light departing the exit slot is of uniform brightness across the length of the slot, and is highly diffuse (nearly uniform luminance from 0° to 90° relative to the exit slot). In a typical film scanner, the light leaving the exit slot at angles from 0° to about 45° is used, providing illumination of the film and suppressing the optical effect of scratches in the film. Light at higher angles (typically all light beyond about 45°) is of no use, and therefore represents a loss in efficiency. Furthermore, this wasted light may undergo various reflections within the optics of the Scanner and fall upon the detector, creating flare. The light beyond 45° also passes through the film, causing additional heating (and thereby mechanical distortion) of the film from partial absorption by the film, and causing degradation of the film through various well known effects of light and heat on the aging of film.

Figure 2:
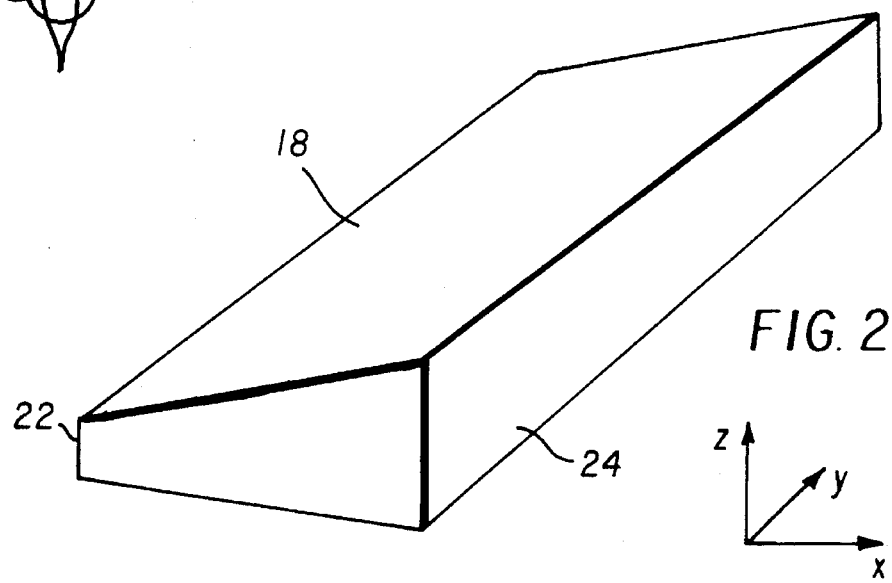
FIG. 2 is a detailed view of the non-imaging wedge optic as shown in FIG. 1.

According to the present invention, the width of the exit slot 16 has been reduced from that of the typical prior art light source (e.g. from 2 mm to 1.4 mm for a light source for a 35 mm film scanner), and a wedge-shaped non-imaging optical element 18 has been added between the exit slot 16 and the film 20. FIG. 2 shows a perspective view of the wedge-shaped non-imaging optical element 18. The non-imaging optical element 18 may be a solid, dielectric material (such as glass) with a sufficiently high index of refraction (typically greater than $\sqrt{2}$), or the non-imaging optical element 18 may be hollow with specularly reflecting interior surfaces such as aluminum or silver mirrors. The light inside the integrating cavity exits the integrating cavity through the exit slot 16 and enters the narrow face 22 of the non-imaging optical element 18. The shape of the non-imaging optical element 18 permits the beam of light to expand in the z-direction, simultaneously reducing the angular divergence. When the light enters the narrow face 22 of the non-imaging optical element 18, it is completely diffuse, with the luminance uniform out to 90°. When the light exits the wide face 24, luminance is uniform out to $\theta_o$, and the luminance is 0 (no light) beyond $\theta_o$, where $\theta_o$ is determined according to Equation 1.

$$w_o \sin \theta_o = w_i,\qquad(1)$$

where $w_o$ is the width of the wide edge 24 of the non-imaging optical element 18 and $w_i$ is the width of the narrow edge 22 of the non-imaging optical element 18.

The non-imaging optical element 18 expands the light beam from the smaller $w_i$ at the slot to the larger $w_o$ at the output of the non-imaging optical element 18. The film is located adjacent to the non-imaging optical element output edge 24. As an example, if the width of the cylinder exit slot 16 in the prior art was 2 mm, and a $\theta_o=45°$ is desired, then in the embodiment of the present invention shown in FIG. 1, the cylinder exit slot 16 is 1.4 mm and the narrow wedge face 22 has width $w_i=1.4$ mm and the wide wedge face 24 has width $w_o=2$ mm.

Many non-imaging optical element shapes other than a flat walled wedge may be used, for example a "Compound Parabolic Concentrator" (reference book: W. T. Welford and R. Winston, "High Collection Nonimaging Optics," Academic Press 1989, pp. 53–72) may be used as the non-imaging optical element 18.

Figure 3:
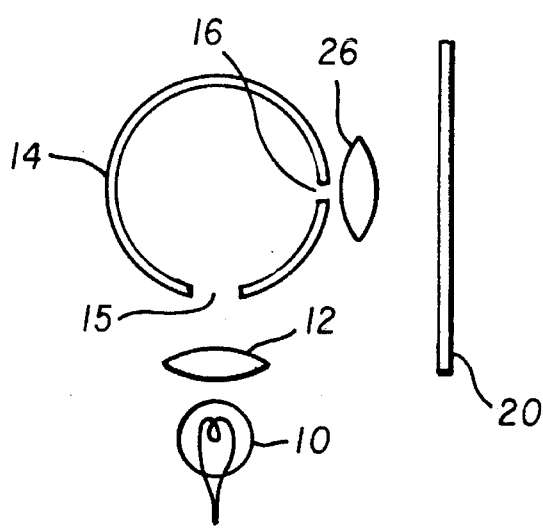
FIG. 3 is an alternative embodiment of a linear light source according to the present invention, using an imaging optic to limit angular range of light output.

As shown in FIG. 3, imaging optics 26 (e.g. cylindrical or spherical lenses) may also be used to decrease the divergence of the light exiting from the slot 16, although imaging optics are generally less efficient than non-imaging optics. The ratio of lens to film distance divided by cylindrical cavity exit to lens distance controls the lens magnification, and thereby the angular divergence at the film, according to well known laws of optics. For example, to achieve results similar to the non-imaging optic version cited above, namely a 1.4 mm wide cylinder exit slot and a 2 mm wide illumination stripe at the film, the distances from exit slot to lens, and from lens to film (measured to the principal planes of the lens) must satisfy the following equation:

$$\frac{\text{lens-to-film}}{\text{slit-to-lens}} = \frac{2 \text{ mm}}{1.4 \text{ mm}}. \quad (2)$$

The invention has been described with reference to preferred embodiments. However, it will be appreciated that variations and modifications can be effected by a person of ordinary skill in the art without departing from the scope of the invention.

PARTS LIST 10 lamp
12 lens
14 cylindrical cavity
15 entry port
16 exit slot
18 non-imaging optic
20 film
22 narrow edge of non-imaging optic
24 wide edge of non-imaging optic
26 imaging optic

I claim:

1. A linear light source for a film scanner, comprising:
   a. a lamp for producing a beam of light;
   b. a cylindrical integrating cavity having an entry port for introducing the beam of light into the cylindrical integrating cavity and a linear slot parallel to a cylindrical axis of the integrating cavity for emitting a line of diffuse light that is uniform over an angular range onto a film; and
   c. an optical element aligned with the slot and located between the slot and the film for reducing the angular divergence of the light exiting from the slot.

2. A linear light source composing:
   a. a lamp for producing a beam of light;
   b. a cylindrical integrating cavity having an entry port for introducing the beam of light into the cylindrical integrating cavity and a linear slot parallel to a cylindrical axis of the integrating cavity for emitting a line of diffuse light that is uniform over an angular range onto a film; and
   c. a non-imaging optical element aligned with the slot and located between the slot and the film for reducing the angular divergence of the light exiting from the slot.

3. The linear light source claimed in claim 2, wherein the non-imaging optical element is a wedge of dielectric material having an index of refraction greater than $\sqrt{2}$.

4. The linear light source claimed in claim 3 for illuminating 35 mm film, wherein: the exit slot is 1.4 mm wide; and the dielectric wedge has a narrow edge 1.4 mm wide adjacent the exit slot, and a wide edge 2 mm wide adjacent the film.

5. The linear light source claimed in claim 2, wherein the non-imaging optical element comprises specularly reflecting surfaces arranged adjacent the exit slot.

\* \* \* \* \*